March 10, 1959    T. H. KELLEY    2,877,249
FATTY ACID RECOVERY FROM SOAP STOCK
Filed Feb. 8, 1954
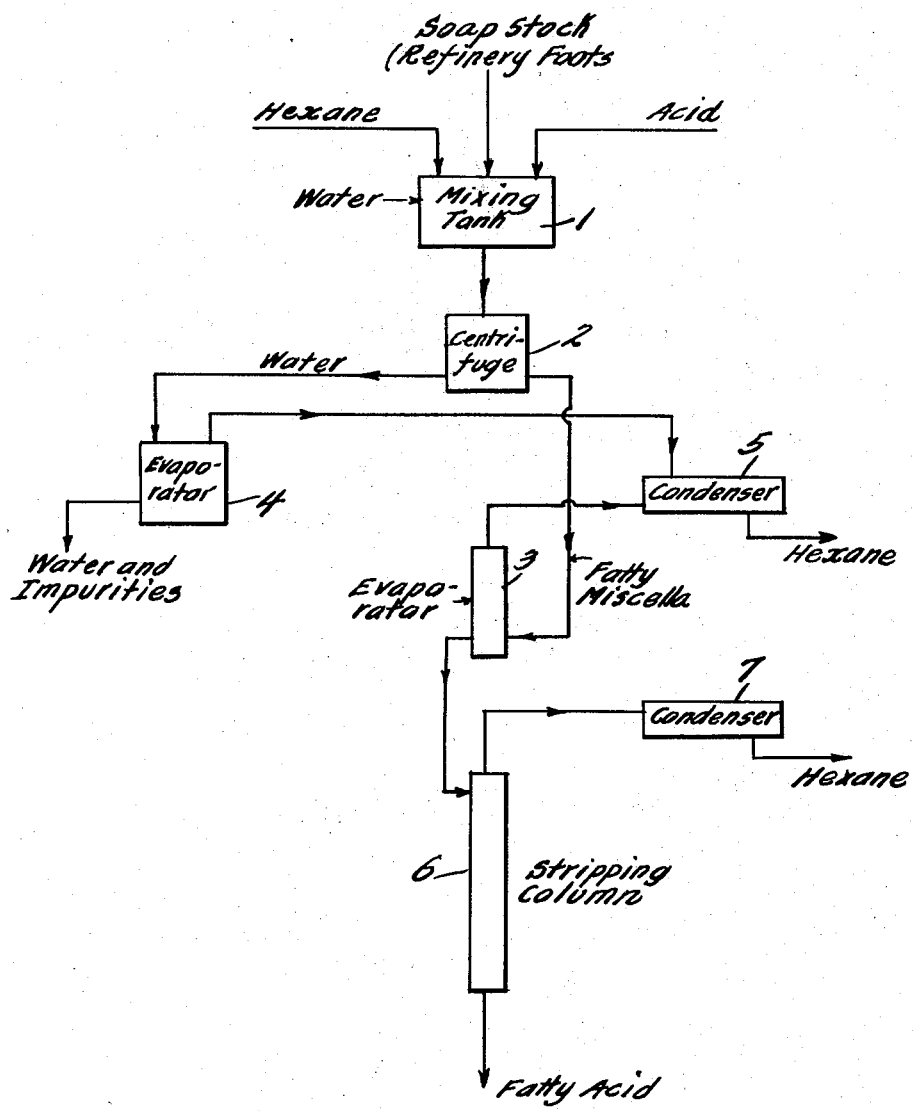
INVENTOR
Thomas H. Kelley
BY Watson, Cole, Grindle & Watson
ATTORNEYS United States Patent Office 2,877,249
Patented Mar. 10, 1959

2,877,249

FATTY ACID RECOVERY FROM SOAP STOCK

Thomas Hardy Kelley, Cincinnati, Ohio, assignor, by mesne assignments, to The Buckeye Cellulose Corporation, Cincinnati, Ohio, a corporation of Ohio Application February 8, 1954, Serial No. 408,763

6 Claims. (Cl. 260—418)

This invention relates to a process for recovering fatty acids from soap stock obtained from the caustic refining of vegetable oils.

In the generally practiced method of refining vegetable oils, the crude oil is treated with sufficient caustic soda solution to neutralize the free fatty acids present with the formation of soap and to react with gums, color imparting bodies and other impurities also present in the oil. In the process, the soap, precipitated impurities and emulsified excess caustic soda solution containing some dissolved impurities, are coagulated by proper temperature control to facilitate separation from the refined oil, and, because of the emulsifying power of the combination, an appreciable amount of neutral oil becomes emulsified with the soap, excess lye and impurities. This combination of soap, excess lye, impurities and emulsified oil is referred to generally in the industry as soap stock or foots.

The soap stock formed in this way is separated from the main body of the refined oil either by gravity or centrifugally and may be sold for soap manufacture. Normally, however, it is acidulated to recover the fatty material present. This acidulation is usually accomplished in the industry in a batch type operation by boiling the soap stock after the addition of sulfuric acid considerably in excess of the amount needed to decompose all the soap present. The acidulated soap stock obtained by this treatment contains a substantial percentage of the impurities and color bodies present in the raw soap stock and is, in general, considered to be of very poor quality. The neutral oil contained in the soap stock is also present in this acidulated soap stock and it is normally further treated, as by twitchellizing or hydrolyzing, to convert this neutral oil to fatty acid. Following this treatment, the hydrolyzed or twitchellized mixture is usually distilled to obtain fatty acids of a usable quality.

It is an object of this invention to provide an improved process for recovering fatty acids from soap stock.

Another object is to provide a continuous process for recovering fatty acids from soap stock.

Another object is to provide a process for recovering fatty acids from soap stock by acidulation whereby the total fatty acid content of the acidulated soap stock is increased.

Still another object is to provide a process for recovering fatty acids from soap stock which substantially decreases the amount of color-producing impurities solubilized in the acidulated soap stock.

Still another object is to provide a process for recovering fatty acids from soap stock which affords a substantial economic advantage over those processes now in use in the industry.

I have found that these objects can be accomplished by mixing the soap stock with water and a substantially water-insoluble solvent for the fatty components, adding sufficient acid to the mixture to bring it to a pH in the range from about 3.0 to 8.5 at a temperature below its boiling point, separating the aqueous phase from the solvent phase which contains fatty acids and neutral oil in solution and removing the solvent from the fatty material.

This process may be applied in the treatment of soap stock derived from vegetable oils generally and those of the oleic-linoleic acid group, e. g. cottonseed, peanut, corn, sesame, and the linolenic acid group, e. g. linseed, soybean, hempseed, in particular. (Classifications for Industrial Oil and Fat Products by A. E. Bailey, 1951, pp. 120–124.)

In a preferred method of praticing this invention, soap stock obtained from the caustic refining of cottonseed oil is first mixed with water and hexane. The pH of the mixture of soap stock, water and hexane is then adjusted to a value in the range from about 3.0 to 8.5 by the addition of sulfuric acid while the mixture is being agitated. This acidulation is carried out at a temperature below the boiling point of the mixture and preferably at from about room temperature (65°–70° F.) to 135° F. The acidulated mixture is then centrifuged at a temperature within this range to separate the fatty miscella (mixture of fatty acid, neutral oil and hexane) from the aqueous phase. The fatty acid-neutral oil mixture is then recovered from the separated miscella by distillation of the hexane.

The aqueous phase is normally heated or distilled to recover any residual solvent and is then usually discarded.

The amount of water added in the above process is not critical and I have found that amounts up to about three times the weight of the soap stock being treated are entirely satisfactory. (In this regard, I should specifically like to point out that very often my process may be carried out without the addition of water, the amount of water present in the soap stock being sufficient to the satisfactory operation of the process.) Amounts of hexane from about one-half to three times the weight of the soap stock may be used.

Depending upon the particular application, following the removal of hexane, the fatty acid-neutral oil mixture may be used directly in the manufacture of soap or other products without further processing, or the mixture may be twitchellized or hydrolyzed to convert the neutral oil to fatty acids, or distilled either before or after conversion of the neutral oil to fatty acids.

The drawing forming part of this application is a schematic diagram representing apparatus suitable for practicing my process in a continuous manner. In the process, refinery foots, hexane, water (if necessary) and sulfuric acid are continuously added to mixing tank 1, which is provided with agitating means, the amount of acid added being regulated so that the pH of the mixture is held at the desired level as hereinbefore described. The acidulated mixture from this tank is then continuously passed to centrifuge 2 wherein the fatty miscella phase and the aqueous phase are separated. The separated fatty miscella phase passes continuously to evaporator 3 wherein a portion of the hexane is vaporized from the miscella. This vaporized hexane is then passed through condenser 5 and recovered in liquid form. The separated aqueous phase goes to evaporator 4 wherein any hexane remaining in this phase is vaporized and also passed to condenser 5. The fatty miscella, partially free of hexane, is then put through stripping column 6 wherein the remainder of the hexane in the miscella is removed, passing to condenser 7. The hexane-free fatty acids coming from the stripping column are normally sent to storage.

It is to be understood that the above description of suitable apparatus is not to be interpreted as limiting my process in any way and that the various operations, e. g., centrifuging, evaporation, condensing, may be satisfactorily accomplished with a variety of equipment available on the open market.

The acidulation procedure common to the industry, i. e., boiling of the soap stock after the addition of a large excess of acid causes a retention of the impurities present in the soap stock in the acidulated soap stock and, as pointed out hereinbefore, results in acidulated soap stock which may be of very poor quality. On the other hand, acidulation according to the present invention, i. e., in the presence of hexane, at a pH from about 3.0 to 8.5 and at a temperature below the boiling point of the mixture, apparently decreases the tendency of the fatty miscella to retain the impurities and instead leaves these impurities in the aqueous phase. Consequently, the acidulated soap stock produced according to the present process contains a much lesser amount of the undesirable impurities initially present in the soap stock.

The optimum separation of the fatty acid miscella and the aqueous phase with my process occurs at a pH in the range from about 5.0 to 7.0 and when the concentration of fatty acids and neutral oil in hexane is from about 5 to 15%. I normally prefer to carry out the acidulation at a pH of about 5.0 to 5.5 and at from room temperature (65° F.) up to about 120° F. Operation under these conditions has the additional economic advantages of reducing corrosion of equipment to a negligible factor, decreasing very substantially the amount of mineral acid used in the acidulation and eliminating water washing of the separated fatty miscella to remove the mineral acid. Moreover, operation at the low temperatures results in a considerable saving in steam costs.

It is to be appreciated that my process may be carried out as either a batch operation or continuously. Also, solvents other than hexane, and generally, those solvents which are substantially insoluble in water and which are capable of dissolving fatty acids and oils, such as, for example, those having the aforesaid characteristics which are set forth in the article by A. Ernest MacGee appearing in the August 1947 issue of the Oil Mill Gazetteer, may be used in the process with comparable results. Those solvents which are most generally used and which are preferred for use in the practice of the present invention are:

A. Those of the aromatic hydrocarbon type, such as—
1. Benzene
2. Methyl benzene
3. Ethyl benzene
4. 1-4-dimethyl benzene
5. 1-3-dimethyl benzene
6. 1-2-dimethyl benzene
7. 1-2-3-trimethyl benzene
8. 1-3-5-trimethyl benzene
9. 1-2-4-trimethyl benzene
10. N-butyl benzene
11. 1-methyl 4-isopropyl benzene
12. 1-methyl 3-isopropyl benzene
13. 1-methyl 2-isopropyl benzene
14. 1-2-4-5-tetramethyl benzene
15. 1-2-3-5-tetramethyl benzene
16. 1-2-3-4-tetramethyl benzene B. Those of the halogenated hydrocarbon type, such as—
1. Methylene chloride
2. Chloroform
3. Carbon tetrachloride
4. Trichlorethylene
5. Perchlorethylene
6. Ethylene dichloride
7. Tetrachlorethane C. Those of the petroleum naphtha type, such as—
1. Iso-pentane
2. N-pentane
3. N-hexane
4. 2-methyl pentane
5. 3-methyl pentane
6. 2-3-dimethyl butane
7. N-heptane
8. 2-methyl hexane
9. 3-methyl hexane
10. 2-2-dimethyl pentane
11. N-octane
12. 2-methyl heptane
13. 3-methyl heptane
14. 4-methyl heptane
15. 2-4-dimethyl hexane
16. 3-4-dimethyl hexane
17. 2-5-dimethyl hexane
18. 2-2-3-trimethyl pentane
19. 2-2-4-trimethyl pentane
20. 2-2-3-3-tetramethyl butane
21. N-nonane
22. 2-methyl octane
23. 3-methyl octane
24. 4-methyl octane
25. 2-4-dimethyl heptane
26. 2-5-dimethyl heptane
27. 2-2-5-trimethyl hexane
28. Decane
29. Undecane
30. Duodecane
31. Tudecane Agents other than sulfuric acid, such as nitric acid, hydrochloric acid, or acid salts capable of reducing the pH to the desired range are equally effective for acidulating the soap stock-solvent mixtures. Organic acids, such as acetic, may also be used in the acidulation but from an economic standpoint are not as desirable as the aforementioned agents.

The following examples are by way of illustration only and the invention is not to be considered as limited thereby but only by the scope of the appended claims.

*Example 1.*—Soap stock from the caustic refining of cottonseed oil was mixed with water and hexane in the ratio, by weight, 2:1:2, soap stock to water to hexane. Several samples of this mixture were then acidulated with sulfuric acid at various temperatures and to various pH values and the acidulated mixtures were centrifuged to separate the fatty miscella from the aqueous phase. The fatty miscella in each case was freed of hexane by vacuum distillation and the total fatty acid content of the hexane-free acidulated soap stock was determined according to the official method G3–39 of the American Oil Chemists' Society.

The blank run was made under conditions common to the industry and comprised acidulating cottonseed oil soap stock by boiling with a large excess of sulfuric acid followed by separation of the aqueous and fatty acid-neutral oil phases. Results on yield of total fatty acids appear in the table below.

| Run | pH | Temperature, °F. | | Percent TFA |
|---|---|---|---|---|
| | | Mixing | Centrifuging | |
| Blank | <1 | | 100 | 83.3 |
| 1 | 4.8 | 112 | 100 | 96.3 |
| 2 | 5.4 | 112 | 100 | 96.3 |
| 3 | 6.5 | 100 | 90 | 93.8 |
| 4 | 7.1 | 80 | 80 | 91.3 |

It may be seen from the above table that the total fatty acid content of the fatty acid-neutral oil phase separated from cottonseed oil soap stock is substantially increased when the process of the present invention is employed.

The hexane-free acidulated soap stocks above were distilled to separate the fatty acids. Color determinations, according to official method Cc136–45 of the American Oil Chemists' Society, were then made on the freshly distilled fatty acids and after the distilled acids had aged overnight at about 180° F. with the following results.

| Run | Color (Red) | |
|---|---|---|
| | Fresh | Aged |
| 1 | 2.7 | 14.6 |
| 2 | 1.9 | 11.8 |
| 3 | 2.4 | 35 |
| 4 | 2.7 | 14.2 |

These values may be compared with the color values of distilled fatty acids obtained by the acidulation of soap stock with an excess of acid at boiling and which normally fall in the range from about 10 to about 20 red when freshly distilled and which are greater than 400 red after aging.

*Example 2.*—Additional runs were made with cottonseed oil soap stock wherein the acidulation was carried out with sulfuric acid according to the process of the present invention and under the conditions indicated in the table below.

| Ratio by weight, Soap Stock: Added Water:Hexane | pH | Temp., °F. | Percent TFA |
|---|---|---|---|
| 1:3:1 | 3.0 | 78 | 97.1 |
| 1:3:1 | 5.1 | 78 | 95.8 |
| 1:1:1 | 2.4 | 90 | 98.7 |
| 1:0:1 | 8.7 | 90 | 90.5 |
| 1:0:1 | 6.3 | 90 | 95.2 |
| 1:1.66:1 | 7.4 | 90 | 93.0 |

The TFA values in the above table may be compared with TFA values in the range from about 70 to 83 which are normal to acidulated soap stocks obtained by boiling this cottonseed oil soap stock with a large excess of acid.

*Example 3.*—Several samples of soap stock from the caustic refining of soybean oil were mixed with hexane and acidulated with sulfuric acid according to the process of the present invention and under the conditions indicated in the table below. The acidulated mixtures were centrifuged to separate the fatty miscella from the aqueous phase, the fatty miscella was freed of hexane by vacuum distillation and the total fatty acid content of the hexane-free acidulated soap stock was determined according to the aforementioned official method of the American Oil Chemists' Society. Results on yield of total fatty acids are included in the following table.

| Run | pH | Approximate Ratio by Weight, Soap Stock:Added Water:Hexane | Temp., °F. | Percent TFA |
|---|---|---|---|---|
| 1 | 4.8 | 1:0:2 | 102 | 99.5 |
| 2 | 6.0 | 1:0:1.6 | 100 | 99.0 |
| 3 | 7.1 | 1:0:1.5 | 98 | 97.6 |
| 4 | 8.0 | 1:0:1.5 | 98 | 98.0 |

As pointed out hereinbefore, the process of my inventino may also be applied in the treatment of soap stock obtained from the refining of other vegetable oils and it is to be understood that other oils, solvents and acidulating agents in comparable proportions may be substituted in the aforesaid specific examples with comparable results.

Having thus described my invention, I claim:

1. In the recovery of fatty acids and neutral oils from vegetable oil soap stock, the process which comprises mixing the soap stock with at least one of the substantially water-insoluble solvents for the fatty components selected from the group consisting of aromatic hydrocarbons, halogenated hydrocarbons and petroleum naphtha hydrocarbons, adjusting the mixture to a pH of about 3.0 to 8.5 at a temperature below its boiling point while the mixture is being agitated whereby the soap-stock impurities tend to concentrate in the aqueous phase, separating the resulting fatty miscella from the aqueous phase at said temperature and removing the solvent from the fatty miscella.

2. In the recovery of fatty acids and neutral oil from vegetable oil soap stock, the process which comprises mixing the soap stock with water and at least one of the substantially water-insoluble solvents for the fatty components selected from the group consisting of aromatic hydrocarbons, halogenated hydrocarbons and petroleum naphtha hydrocarbons, adjusting the mixture by the addition of a mineral acid to a pH of about 3.0 to 8.5, at a temperature in the range of from about 65° F. to about 135° F. and below its boiling point while the mixture is being agitated whereby the soap stock impurities tend to concentrate in the aqueous phase, separating the resulting fatty miscella from the aqueous phase at a temperature in said range and removing the solvent from the fatty miscella.

3. In the recovery of fatty acids, and neutral oil from vegetable oil soap stock the process which comprises mixing the soap stock with water and at least one of the substantially water-insoluble solvents for the fatty components selected from the group consisting of aromatic hydrocarbons, halogenated hydrocarbons and petroleum naphtha hydrocarbons, adjusting the mixture by the addition of a mineral acid to a pH in the range of from about 5.0 to 7.0 at a temperature in the range of from about 65° F. to about 135° F. and below the boiling point of the solvent while the mixture is being agitated whereby the soap stock impurities tend to concentrate in the aqueous phase, separating the resulting fatty miscella from the aqueous phase at a temperature in said temperature range and removing the solvent from the fatty miscella.

4. The process of claim 3 wherein the solvent is hexane.

5. In the recovery of fatty acids and neutral oil from vegetable oil soap stock, the process which comprises continuously flowing together and agitating soap stock, hexane, water and sulfuric acid, at a temperature in the range from about 65° to about 135° F., while regulating the flow of sulfuric acid to control the pH of the resultant mixture to a value within the range from about 3.0 to 8.5 whereby soap stock impurities tend to concentrate in the aqueous phase, continuously centrifuging the said mixture at a temperature in said temperature range to separate the fatty miscella from the aqueous phase, continuously distilling the separated aqueous phase to recover retained hexane, and continuously distilling the fatty miscella to remove the hexane therefrom.

6. In the recovery of fatty acids and neutral oil from cottonseed oil soap stock, the process which comprises mixing the soap stock with water and hexane, acidulating the mixture by the addition of sulfuric acid to a pH of from 5 to 5.5 at a temperature in the range of from about 65° F. to about 120° F. while the mixture is being agitated whereby the soap stock impurities tend to concentrate in the aqueous phase, separating the resulting fatty miscella from the aqueous phase at a temperature in said range and removing the hexane from the fatty miscella.

References Cited in the file of this patent
UNITED STATES PATENTS

| | | |
|---|---|---|
| 1,889,652 | Gensecke | Nov. 29, 1932 |
| 2,054,096 | Potts | Sept. 15, 1936 |
| 2,171,202 | Urbain et al. | Aug. 29, 1939 |

OTHER REFERENCES

Official and Tentative Methods of Analysis of The A. O. A. C. Published by the Association of Official Agricultural Chemists, Washington 4, D. C., 6th edition, 1945 (pp. 525 and 526).

Bailey: Industrial Oil and Fat Products, 2nd edition, 1951, Interscience Publ., N. Y. C., pp. 646–649.